United States Patent
Koehler

(10) Patent No.: US 11,076,227 B2
(45) Date of Patent: Jul. 27, 2021

(54) METHOD AND DEVICE FOR DETECTING DAMAGE TO A MOTOR VEHICLE

(71) Applicant: Robert Bosch GmbH, Stuttgart (DE)

(72) Inventor: Armin Koehler, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/868,880

(22) Filed: May 7, 2020

(65) Prior Publication Data

US 2020/0359131 A1 Nov. 12, 2020

(30) Foreign Application Priority Data

May 8, 2019 (DE) .......................... 102019206626.7

(51) Int. Cl.
*H04B 1/00* (2006.01)
*H04R 3/00* (2006.01)
*G06N 20/00* (2019.01)

(52) U.S. Cl.
CPC ............. *H04R 3/005* (2013.01); *G06N 20/00* (2019.01); *H04R 2499/13* (2013.01)

(58) Field of Classification Search
CPC ....................................................... H04B 1/00
See application file for complete search history.

(56) References Cited

U.S. PATENT DOCUMENTS

| | | | |
|---|---|---|---|
| 2014/0100714 A1* | 4/2014 | Linn ....................... | G01M 7/02 701/2 |
| 2018/0094969 A1* | 4/2018 | Kim .................... | B60R 21/0132 |
| 2019/0381964 A1* | 12/2019 | Halford ................ | B60R 25/102 |
| 2020/0365140 A1* | 11/2020 | Jales Costa ......... | H04L 63/1425 |

* cited by examiner

*Primary Examiner* — Olisa Anwah
(74) *Attorney, Agent, or Firm* — Norton Rose Fulbright US LLP; Gerard Messina

(57) ABSTRACT

A method for detecting damage to motor vehicles. The method includes: acquiring at least one external microphone signal that was ascertained using at least one external microphone, acquiring at least one internal microphone signal that was ascertained using at least one internal microphone, comparing the at least one external microphone signal and the at least one internal microphone signal, and ascertaining a compare function, which represents a deviation between the external microphone signal and the internal microphone signal, and ascertaining a damage classification for classifying the damage to the motor vehicle based on the compare function.

14 Claims, 2 Drawing Sheets

METHOD AND DEVICE FOR DETECTING DAMAGE TO A MOTOR VEHICLE

CROSS REFERENCE

The present application claims the benefit under 35 U.S.C. § 119 of German Patent Application No. DE 102019206626.7 filed on May 8, 2019, which is expressly incorporated herein by reference in its entirety.

BACKGROUND INFORMATION

A method and a device for detecting damage to a motor vehicle are described here, in particular for detecting damage sustained by the motor vehicle while the motor vehicle has been moving in a very low velocity range or even when it was at a standstill.

Damage to the motor vehicle can occur during driving or while it is at a standstill. When a motor vehicle is driving, it may itself actively cause damage through contact with other vehicles, objects and persons. If the ego vehicle is at a standstill, then damage will more likely be caused by other motor vehicles. For example, collisions may occur in the course of parking maneuvers of other motor vehicles, or damage that is the result of vandalism, in which context in particular scratched doors or environmental influences such as hail could be mentioned.

At higher velocities, collisions pose a risk of injury to the passengers of the motor vehicle or to the passengers of accident opponents. Accident opponents, for example, are other motor vehicles involved in a collision.

Passive safety systems are used in motor vehicles to protect passengers in the event of an accident (collision). Such passive safety systems are all systems that do not themselves intervene in the control of the motor vehicle and, for instance, are able to induce an accident avoidance (through evasive maneuvers or the like), but which respond to occurring accident events merely in a passive manner.

Selective triggering of passive safety systems in the event of accident events requires sensors that are able to identify the type and the scope of the accident event. Using data ascertained with the aid of such sensors, passive safety systems are then able to be triggered in a selective manner. The triggering of passive safety systems is usually not carried out on the basis of only one external sensor system that specifies a reason for the triggering. Generally, a complex system exists, which is made up of a plurality of sensor systems in which positive paths are provided in which positive sensor signals induce the triggering of passive safety systems. Often, there are also negative paths in these systems, in which negative sensor signals prevent the triggering of passive safety systems even if existing signals on positive paths would cause a triggering.

SUMMARY

In accordance with the present invention, a particularly advantageous example method and a particularly advantageous example device for detecting damage to vehicles are provided and are described herein. The example method and the example device may be part of a sensor system for detecting accidents of a motor vehicle. The example method and the example device are applicable especially in the very low velocity range, but are also suitable for any velocity range.

In accordance with an example embodiment of the present invention, a method for detecting damage to vehicles is provided, the method including the following steps:
a. Acquiring at least one external microphone signal that was ascertained using at least one external microphone,
b. Acquiring at least one internal microphone signal that was ascertained using at least one internal microphone,
c. Comparing the external microphone signal and the internal microphone signal and ascertaining a compare function, which represents a deviation between the external microphone signal and the internal microphone signal, and
d. Ascertaining a damage classification for classifying the damage to the vehicle based on the compare function.

According to the related art, current systems generally detect damage to a vehicle only starting at a predefined lower parameter, e.g., starting at a certain lower velocity or acceleration. Using the example method and the example device according to the present invention, damage is also able to be identified in a very low velocity range or at a standstill because the microphone used for this purpose functions as a sound recorder and a converter into electronic signals, in which the velocity plays no role.

Even an impact at a low velocity is difficult for a passenger to notice on account of the relatively weak jolts in comparison with a high velocity. In particular when no passengers are inside the vehicle during a standstill, the question arises how the damage is able to be ascertained in a timely manner. Instead of the human ear, a microphone or a plurality of microphones may be used, which functions as a sound recorder and converter into electronic signals and is able to monitor the motor vehicle around the clock. In addition, microphones generally require less of an outlay in terms of hardware in comparison with conventional sensor systems.

In this way, damage is able to be detected early enough to avoid hit-and-run incidents, to clarify the liability question, to initiate repairs, and to make a report to the insurance company. In the case of vehicles driving in an automated manner, the described method and the device in particular allow for immediate stopping after damage has been detected and for assessing and clarifying and/or interpreting the situation.

Damage to or an impact on the vehicle body usually generates a characteristic oscillation, which is able to propagate in the form of sound waves as pressure and density fluctuations in an elastic medium (e.g., air or a vehicle body). For this reason, the oscillation is also noticeable in the vehicle interior; however, depending on the vehicle type and the conditions, the oscillation is attenuated in its magnitude.

A microphone is able to record a mechanical oscillation and to convert it into a microphone signal in the corresponding electrical voltage changes. Furthermore, a signal processor is able to use such a converted electronic signal for a variety of application purposes.

In step a) of the example method according to the present invention, the term 'external microphone' thus particularly means the microphone that is fixed in place in the external space of the vehicle and used for recording oscillations in the external space. The term 'external microphone signal' corresponds to the electronic signal converted by the external microphone. It is also possible to provide and evaluate a plurality of external microphones, e.g., one or a plurality of external microphone(s) for each side of the motor vehicle.

In step b) of the example method according to the present invention, the term 'internal microphone' thus particularly means the microphone that is fixed in place in the interior region of the vehicle and used for recording the oscillations that have been propagating from the external space to the internal space. The term 'internal microphone signal' corresponds to the electronic signal converted by the internal microphone. It is also possible to provide and evaluate a plurality of internal microphones, e.g., one or a plurality of internal microphone(s) for each side of the motor vehicle.

The at least one external microphone signal and the at least one internal microphone signal are preferably received by a control unit, which is provided and set up to carry out the described method.

In step c) of the example method in accordance with the present invention, a compare function is ascertained through a comparison of the at least one external microphone signal acquired according to step a) and the at least one internal microphone signal acquired according to step b), with the compare function representing a deviation between the external microphone signal and the internal microphone signal.

The physical basis that leads to the possibility of carrying out a comparison of the signals and for using this comparison as the basis for a later analysis and ascertainment of a damage classification is the following:

Different physical mechanisms may come to act in the propagation of sound from the external space to the internal space. The first physical propagation mechanism of relevance in this context is the airborne sound or the airborne sound transmission. This propagation mechanism comes to bear wherever a path from the external space to the internal space extends through the air or through gaseous media. The second physical propagation mechanism of relevance here is the structure-borne sound or the structure-borne sound transmission. This propagation mechanism comes to bear wherever the path from the external space to the internal space runs through solid bodies.

The propagation path of the sound from the external space to the internal space is able to be subdivided—in the way of a model/conceptually—into a multitude of individual sub-propagation distances, which are partially switched in parallel with one another and are partially switched in series. Certain physical conditions come to act in each one of these sub-propagation distances, which respectively have individual compare functions. Taken as a whole, these compare functions form an overall compare function.

This overall compare function of the external space to the internal space may depend on the respective position in which the sound source exists. For a sound event that takes place at the front side of the motor vehicle, the overall compare function differs from that of a sound event that takes place at a rear side of the motor vehicle. Moreover, this compare function is also influenced by modifications on the body of the vehicle, sometimes even already by an open or a closed window on the vehicle body. An open window will more likely amplify the airborne sound transmission. A closed window will most likely amplify the structure-borne sound transmission.

It is therefore particularly advantageous to carry out the signal comparison under consideration of different influencing factors of the sound propagation in the time range and/or frequency range. Moreover, it is advantageous to consider the influencing factors at least partially as a parameter function during the comparison.

In this instance, the compare function represents a deviation between the at least one external microphone signal and the at least one internal microphone signal, which includes a damping function of the airborne sound transmission and/or a transmission function of the structure-borne sound transmission.

In step d) of the example method in accordance with the present invention, a damage classification for the classification of the damage to the vehicle is ascertained based on the compare function determined in step c).

This is possible, for instance, because damage that has occurred generally causes the corresponding component/system of the motor vehicle to no longer exhibit the predefined characteristic. With the aid of the analysis of the ascertained compare function, which is at least partially dependent upon the characteristic of the motor vehicle, the damage is detectable and the damage location as well as the damage class, etc. are able to be classified.

In one preferred embodiment of the method in accordance with the present invention, the comparison in step c) includes the ascertaining of a transmission function for the propagation of sound from the external space to the internal space.

In engineering science system theory, the transmission function describes in mathematical terms the relationship between the input and output signal of a linear dynamic system in the time range/frequency space, which are defined by the properties of the system. This particularly means that a transmission function that is a function of the mechanical properties of the vehicle body is effective when the sound wave is transmitted via structure-borne sound in the vehicle body from the outside to the inside.

With the aid of the transmission function, it is possible to determine the expected internal microphone signal for any external microphone signal in the presence of an intact vehicle body. Or conversely, the transmission function is able to be determined by comparing the external microphone signal to the internal microphone signal.

For example, damage to the vehicle body has different mechanical properties than in a fault-free state, and thus also a changed transmission function. In this instance, the damage is able to be detected by comparing the ascertained transmission function to the transition function, which is predefined under fault-free conditions through experiments. This transition function, which would be present under fault-free conditions, will hereinafter also be called a "pattern function" or a "pattern transmission function".

In an additional preferred embodiment of the method according to the present invention, the comparison in step c) includes the ascertainment of a damping function for the propagation of sound from the external space to the internal space.

The ascertainment of a damping function is possibly mathematically less complex than the ascertainment of a complete transmission function that was described above and precisely describes the signal transmission of sound from the external space to the internal space in mathematical terms. In preferred embodiment variants, "only" one damping function and no more complex, exact mathematical transmission function is ascertained for the comparison. The described method may then be carried out more efficiently (or in other words, with a lower computational effort).

When sound propagates in the air or in gases, this involves airborne sound, for which the damping function becomes effective. The damping function describes the hampering of the sound propagation by the absorption of airborne sound, which depends on the temperature, the relative humidity, the sound frequency and the distance from the sound source. Airborne sound and structure-borne sound often transition into each other. The sound waves, for example, propagate via the air (airborne sound). When the airborne waves encounter an object (the vehicle body), they set it into oscillations (structure-borne sound). Structure-borne sound may transition back to airborne-sound again at the surface of objects, which is why it is advantageous to consider the damping function in connection with the transmission function and/or as a sub-function of the transmission function.

Generally, airborne sound damping is able to be described by a mathematical formula using certain parameters of the temperature and humidity, for instance. The damping function is therefore able to be ascertained with the aid of a mathematical model, e.g., by the input of the real-time parameters of the internal microphone signal and the external microphone signal.

In another preferred embodiment of the method according to the present invention, the ascertainment of the compare function in step c) is carried out using the correlation in the time range, with the correlation describing the relation between the external microphone signal and the internal microphone signal.

In this context, a correlation particularly refers to a cross-correlation. If the external microphone signal differs from the internal microphone signal, the two signals are cross-correlated via the time variable (t), and the similarity between the two signals is examined using the cross-correlation integral. The correction or the cross-correlation of the time-based signals is often realized in hardware or software on the respective electronics (e.g., FPGA, signal processor).

In an advantageous manner, the irrelevant noise, i.e., the interference, is able to be detected and removed with the aid of the correlation or cross-correlation. An irrelevant noise, for instance, may be human speech in the vehicle interior.

In one further preferred embodiment of the method in accordance with the present invention, the comparison in step c) includes a division in the frequency range.

In this embodiment variant, the comparison is carried out using the frequency range of the respective signals. In order to be able to perform the comparison in the frequency range, the signals (the internal microphone signal and the external microphone signal) must both be transferred into the frequency range or into a frequency spectrum. The internal microphone signal and the external microphone signal both run via the time variable (t) during the receiving. The description of this signal in the frequency range or using a frequency spectrum is based on the possibility of putting such a temporal microphone signal together as a sum or an integral of complex exponential functions of different frequencies.

The complex exponential functions are termed an "advanced function" in this context. The frequency spectrum describes the weighting (i.e. the magnitude) at which the advanced function associated with the respective frequency is entered into the overall signal. In other words, this means that the microphone signal is able to be broken down into a multitude of harmonic oscillations, with each harmonic oscillation having its own frequency. If all frequencies of the individual harmonic oscillations are assembled on an abscissa, then the frequency spectrum is created, with the ordinate corresponding to an amplitude of a harmonic oscillation.

Through the division in the frequency range, it is particularly advantageous to more easily observe the information contained in the signal that is not evident in the time range. The division also facilitates the synthesizing or the breakdown of a signal or a plurality of signals (in this instance, the internal microphone signal and the external microphone signal), which simplifies the comparison of the signals. In particular, frequency-dependent partial signals are able to be synthesized from the internal microphone signal and the external microphone signal, which are able to be individually compared to one another in order to enable the damage classification in step d). In the technical realization, a spectrum analyzer may be used for acquiring and representing a signal in the frequency range.

In one further preferred embodiment of the method according to the present invention, the ascertainment of the compare function in step c) is carried out by machine learning.

If a microphone is not functioning properly, then the signal it has acquired no longer resembles the signal of correctly operating microphones (zero-symmetrical), so that the acquired individual signals are no longer able to describe the same event (accident event or damage event). In this case, the correlation coefficient (product-moment-correlation) in the ascertainment of the compare function in step c) tends toward zero. It is particularly advantageous in this context to perform the comparison in conjunction with machine learning (ML, DNN Algo) because it provides excellent accuracy in the detection of the signal patterns and has a continual, automatic improvement potential.

The acquired external and internal microphone signals are first pretreated by the previously described compare method, the signals, for instance, being transformed from the time range to the frequency range by a transformation, so that the subsequent analysis in the machine learning is able to be simplified.

Next, the pretreated external and internal microphone signals are input into an artificial neural network (abbreviated ANN). In the ANN, the respective external and internal microphone signal is compared to the signal patterns stored in a database in order to classify the individual signal. If the external and the internal microphone signals do not belong to the same classification, then this indicates that the two signals do not describe the same event. It may therefore be detected that no accident event or damage event is present because an accident event and a damage event usually generate both an external microphone signal and an internal microphone signal. In this way, it is therefore possible to identify signals that are not caused by an accident event or a damage event. Such signals may also be referred to as artifact signals. Signals identified through machine learning as not being based on a damage event or an accident event are preferably classified in step d) as "not damaged" or as "no damage" in the damage classification.

In addition, it is particularly advantageous if a recurrent neural network is used in step c). Such a neural network makes it possible to build up expert knowledge from classified compare functions, which is used for the renewed generation of compare functions (step c) and damage classifications (step d). This is preferably realized in that the result from step d) (the damage classification) is fed back. For example, it is possible in this way to store each output signal as a sample signal in a database of the ANN so that the database is able to be automatically expanded in accordance with the "experience" of the ANN. During the next input of the input signal, the ANN is therefore able to output the result even faster, more effectively and more precisely. This process is also known as "training".

In the least complicated case, the damage classification may specify only two different states, i.e., the state of "not damaged/normal" and the state of "damaged". In step d), a grouping into these two states is then performed on the basis of the compare function. In further embodiment variants, the damage classification may also be more detailed and additionally provide different types of damage, e.g., hail damage, vandalism by scratching, collision during a parking operation, stone throws, etc. In step d), a classification into these damage classes is then provided on the basis of the compare function.

In an additional preferred embodiment of the method in accordance with the present invention, the comparison in step c) includes a transformation.

Using any preferred transformation, the signal is more easily (or with less of a computational effort) transformable into the frequency range, which means that that the comparison of the signals is simplified.

In this context, it is also possible to compare the acquired signals to the signal pattern, e.g., a noise pattern of vandalism and/or hail or other typical damage events in the frequency range, which differ in their amplitudes.

It is particularly advantageous here to use the wavelength transformation, in which—in contrast to the Fourier transform—a time window function is additionally applied to the signal to be examined, so that the signal to be examined may be viewed "as a small wave" (wavelet). The wavelet transformation ensures a relatively better compromise between excellent time resolution and excellent resolution in the frequency range, and is particularly advantageous for the aperiodic acoustic signal processing. This type of transformation not only provides greater accuracy but also requires a lower computational effort.

In a further preferred embodiment of the method according to the present invention, a classification of damage in step d) takes place if an unexpected deviation has occurred between an amplitude in the internal microphone signal and an amplitude in the external microphone signal.

A classification of damage in particular takes place in the case of a larger amplitude in the internal microphone signal. This especially means that a larger amplitude of the oscillations is seen in the case of damage than under normal circumstances, i.e., in a damage-free state.

In another preferred embodiment of the method according to the present invention, a comparison of the compare function with a pattern function stored for the vehicle takes place in step d).

It is particularly preferred if the pattern function includes a damping function or a vehicle-specific damping factor, which describes a transmission of sound waves through the air from the external space to the internal space.

In addition, it is preferred if the pattern function includes a transmission function that is a function of the mechanical properties of the vehicle body and describes a transmission of sound waves via structure-borne sound in the vehicle body from the external space to the internal space.

A pattern function usually describes what is termed the "normal case", which is encountered when a motor vehicle shows no damage and in particular when the motor vehicle body is free of damage. Damage is able to be identified on the basis of deviations from the pattern function.

Motor vehicles include components that generate noise such as the engine. If damage occurs on such a noise-generating component, then the particular damaged component/system of the vehicle usually no longer has the predefined properties it would have during a normal operation and thus exhibits a changed noise. A defect in the operation of the motor such as a defect on pistons or on the crankshaft, for instance, may cause a slight change in the engine noise. Resonances are produced in the process. If a part does not function as intended, then the resonant frequency of the entire engine changes. A collision with different objects at different velocities likewise generates characteristic noise. In the same way, there are specific noises for events such as vandalism or hail.

All of these typical noises are able to be compared as pattern signals with the acquired, at least one external microphone signal and the acquired, at least one internal microphone signal as well as the ascertained compare function. This makes it possible to identify damage and possibly the type of damage.

As a further aspect of the present invention, a control unit for a motor vehicle is provided, which is set up to carry out the described method. The special advantages and embodiment features described above are applicable and transferrable to the control unit.

In addition, a computer program is provided in accordance with the present invention, which is set up to carry out all of the steps of the described method. Moreover, a machine-readable memory medium is provided in accordance with the present invention on which the described computer program is stored. The special advantages and embodiment features described earlier in the text are applicable and transferrable to the computer program and the machine-readable memory medium.

Also, in accordance with the present invention, a device for detecting the damage to the vehicle is provided. In accordance with the present invention, the device includes
at least one external microphone for acquiring an external microphone signal;
at least one internal microphone for acquiring an internal microphone signal, and
a control unit, which is set up to compare the internal microphone signal and the external microphone signal. The control unit is particularly set up to carry out the method as recited in one of the preceding claims.

The embodiment features and advantages described above in connection with the example method of the present invention are applicable and transferrable to the example device. The same applies to the embodiment features and advantages of the example device of the present invention, which are applicable and transferrable to the above-described method.

The example device preferably has the correspondingly required number of external microphones and internal microphones. The external microphones are fixed in place in suitable locations on the vehicle so that the oscillations from the external space of the motor vehicle are effectively recordable by the external microphones. Accordingly, the internal microphones are fixed in place in the internal space of the vehicle in such a way that the oscillations propagating from the external space to the internal space are effectively recordable.

The external microphones and the internal microphones may be connected to the data-reading, data-processing and memory unit, which is coupled with a control unit. The external microphone signals and the internal microphone signals are able to be transmitted in a wireless manner and/or with the aid of a CAN bus.

Example embodiments of the method in accordance with the present invention, as well as its technical environment, is described in greater detail below with the aid of the figures.

DETAILED DESCRIPTION OF EXAMPLE EMBODIMENTS

Figure 1:
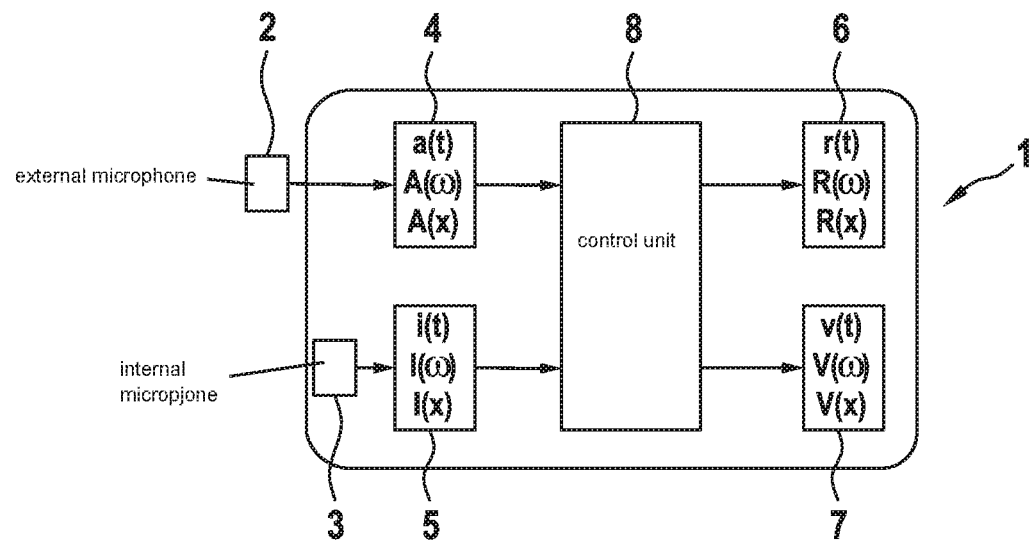
FIG. 1 show a representation of the basic features of the present method for detecting damage to the motor vehicle.

FIG. 1 shows the basic features of the example method in accordance with the present invention. External microphone 2 is fixed in place in the external region of motor vehicle 1 and used for recording external microphone signal 4 in the form of $a(t)$, $A(\omega)$ and $A(x)$. Internal microphone 3 is fixed in place in the internal region of motor vehicle 1 and used for recording internal microphone signal 5 in the form of $i(t)$, $I(\omega)$ and $I(x)$. External microphone signal 4 and internal microphone signal 5 are received by control unit 8, which is provided and set up to carry out the described method. Compare function 7, which represents a deviation between external microphone signal 4 and internal microphone signal 5, is ascertained in the form of $v(t)$, $V(\omega)$ and $V(x)$ by comparing external microphone signal 4 and internal microphone signal 5. The damage is detected and classified based on ascertained compare function 7. Residual signal 6 in the form of $r(t)$, $R(\omega)$ and $R(x)$ is not caused by the damage.

Figure 2:
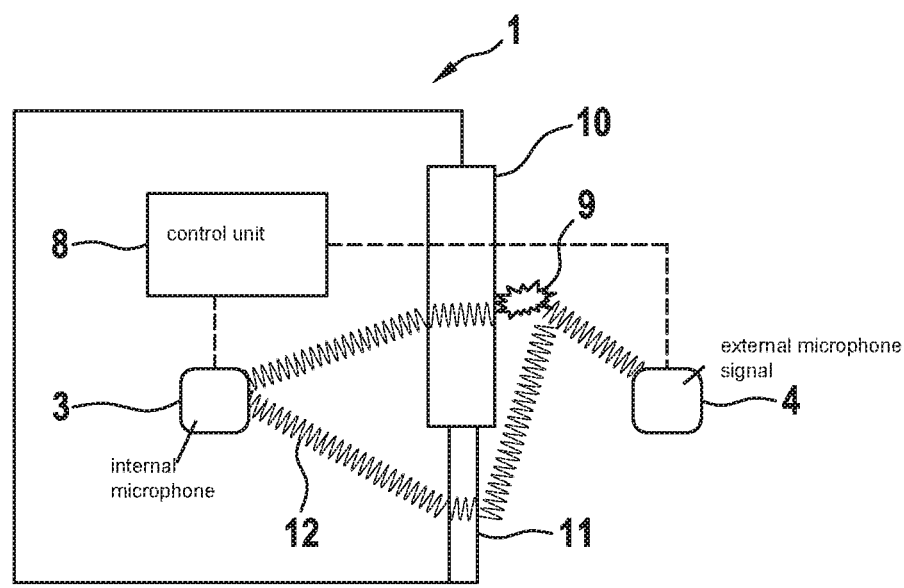
FIG. 2 shows a representation of the sound propagation path.

FIG. 2 illustrates the sound propagation path. A damage location 9 on body 10 of motor vehicle 1 generates sound that occurs wherever sound propagation path 12 from the external space to the internal space runs through the air or through the vehicle body. Airborne sound and structure-borne sound differ according to sound propagation path 12 through the air or through solid bodies. Airborne sound and structure-borne sound frequently transition into each other.

When window 11 is open, then the sound is able to propagate through the air directly from the external space to the internal space of motor vehicle 1 on the one hand, and in parallel via vehicle body 10 through vibrations on the other hand.

When window 11 is closed, then the airborne sound impinges upon window 11 and creates structure-borne sound in window 11. The structure-borne sound may transition to airborne sound again at the surface of window 11 or vehicle body 10.

Figure 3:
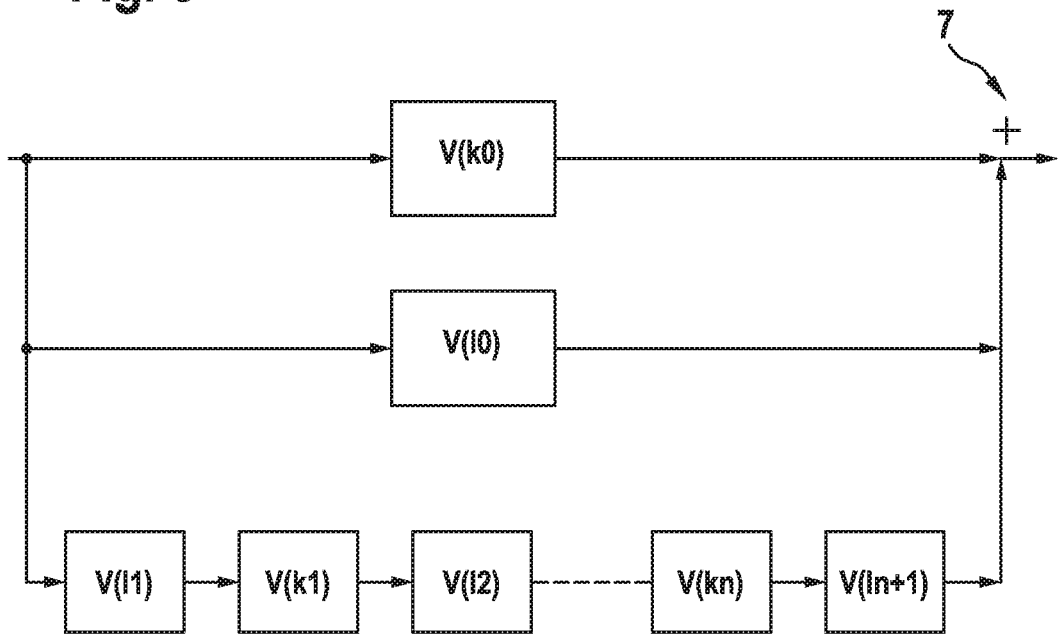
FIG. 3 shows a model-type representation of the sound propagation path.

FIG. 3 shows a model-type representation of the sound propagation path by way of example. Because airborne sound and structure-borne sound frequently transition into each other, sound propagation path 12 from the external space to the internal space may be subdivided—in the way of a model/conceptually—into a multitude of individual sub-propagation distances, which are partially switched in parallel with one another and partially switched in series. Certain physical conditions are acting in each one of these sub-propagation distances, which respectively have individual compare functions in the form of $V(I0)$, $V(I1)$, $V(I2)$, $V(In+1)$, $V(k0)$, $V(k1)$, $V(kn)$. Taken as a whole, these compare functions form an overall compare function 7.

Figure 4:
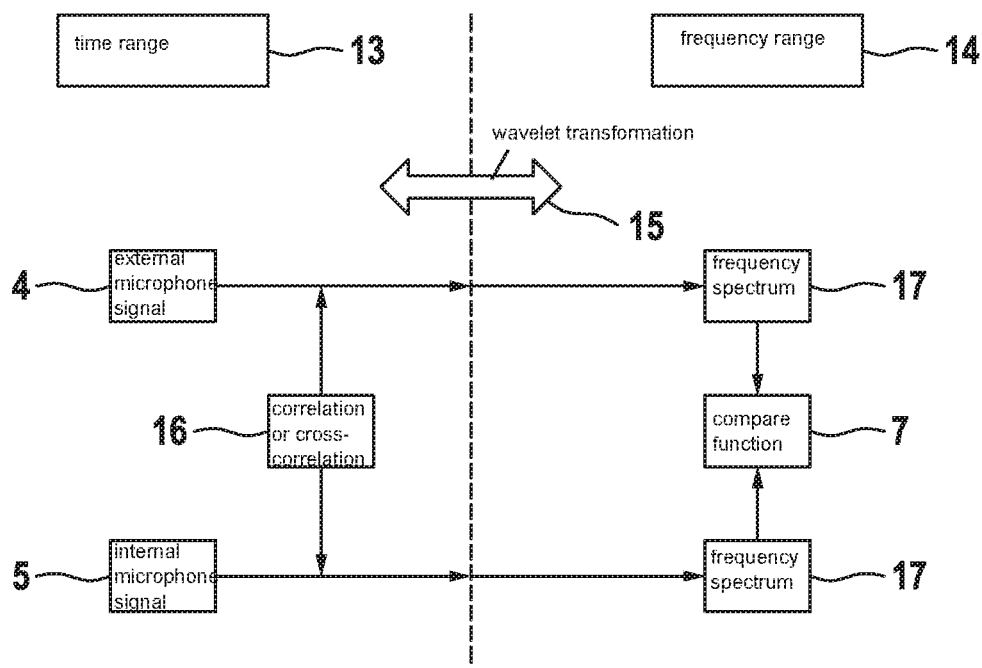
FIG. 4 shows a schematic representation for ascertaining the compare function.

FIG. 4 shows a schematic representation for ascertaining the compare function 7. The external microphone signal 4 and the internal microphone signal 5 by nature are temporal signals, which run across time variables (t) and have the corresponding amplitudes at different points in time. In the time range 13, through a correlation or cross-correlation 16, the interference (e.g., human conversation in the vehicle interior) is removed and the signals 4, 5 in the frequency range 14 or respectively in a frequency spectrum 17 are subsequently transformed with the aid of the wavelet transformation 15 into the frequency range, where the compare function is ascertained.

What is claimed is:

1. A method for detecting damage to motor vehicles, the method comprising:
    (a) acquiring at least one external microphone signal that was ascertained using at least one external microphone;
    (b) acquiring at least one internal microphone signal that was ascertained using at least one internal microphone;
    (c) comparing the at least one external microphone signal and the at least one internal microphone signal and ascertaining a compare function, which represents a deviation between the external microphone signal and the internal microphone signal; and
    (d) ascertaining a damage classification for classifying damage to the motor vehicle based on the compare function;
    wherein the comparing includes ascertaining a transmission function and/or a damping function for a propagation of sound from an external space of the vehicle to an internal space of the vehicle.

2. The method as recited in claim 1, wherein the comparing includes the ascertaining of the transmission function for the propagation of sound from the external space of the vehicle to the internal space of the vehicle.

3. The method as recited in claim 1, wherein the comparing includes the ascertaining of the damping function for the propagation of sound from an external space of the vehicle to the internal space of the vehicle.

4. The method as recited in claim 1, wherein the ascertaining of the compare function in task (c) is carried out via a correlation in a time range.

5. The method as recited in claim 1, wherein the comparing includes a division in a frequency range.

6. The method as recited in claim 1, wherein the ascertaining of the compare function in task (c) is carried out by machine learning.

7. The method as recited in claim 1, wherein the comparing includes a transformation.

8. The method as recited in claim 1, wherein a classification of damage in task (d) takes place when an unexpected deviation has occurred between an amplitude in the internal microphone signal and an amplitude in the external microphone signal.

9. The method as recited in claim 1, wherein a comparison of the compare function with at least one pattern function stored for the vehicle takes place in task (d).

10. A method for detecting damage to motor vehicles, the method comprising:
    (a) acquiring at least one external microphone signal that was ascertained using at least one external microphone;
    (b) acquiring at least one internal microphone signal that was ascertained using at least one internal microphone;
    (c) comparing the at least one external microphone signal and the at least one internal microphone signal and ascertaining a compare function, which represents a deviation between the external microphone signal and the internal microphone signal; and
    (d) ascertaining a damage classification for classifying damage to the motor vehicle based on the compare function;
    wherein a comparison of the compare function with at least one pattern function stored for the vehicle takes place in task (d), and
    wherein the pattern function includes a damping function or a vehicle-specific damping factor, which describes a transmission of sound waves through air from an external space of the vehicle to an internal space of the vehicle.

11. A method for detecting damage to motor vehicles, the method comprising:
(a) acquiring at least one external microphone signal that was ascertained using at least one external microphone;
(b) acquiring at least one internal microphone signal that was ascertained using at least one internal microphone;
(c) comparing the at least one external microphone signal and the at least one internal microphone signal and ascertaining a compare function, which represents a deviation between the external microphone signal and the internal microphone signal; and
(d) ascertaining a damage classification for classifying damage to the motor vehicle based on the compare function;
wherein a comparison of the compare function with at least one pattern function stored for the vehicle takes place in task (d), and
wherein the pattern function includes a transmission function, which is a function of mechanical properties of a body of the vehicle and describes a transmission of sound waves via structure-borne sound in the body of the vehicle from an external space of the vehicle to an internal space of the vehicle.

12. An apparatus for a motor vehicle configured to detect damage to motor vehicles, comprising:
a control unit configured to perform the following:
(a) acquire at least one external microphone signal that was ascertained using at least one external microphone;
(b) acquire at least one internal microphone signal that was ascertained using at least one internal microphone;
(c) compare the at least one external microphone signal and the at least one internal microphone signal and ascertaining a compare function, which represents a deviation between the external microphone signal and the internal microphone signal; and
(d) ascertain a damage classification for classifying damage to the motor vehicle based on the compare function;
wherein the comparing includes ascertaining a transmission function and/or a damping function for a propagation of sound from an external space of the vehicle to an internal space of the vehicle.

13. A non-transitory machine-readable memory medium on which is stored a computer program, which is executable by a processor, comprising:
a program code arrangement having program code for detecting damage to motor vehicles, by performing:
(a) acquiring at least one external microphone signal that was ascertained using at least one external microphone;
(b) acquiring at least one internal microphone signal that was ascertained using at least one internal microphone;
(c) comparing the at least one external microphone signal and the at least one internal microphone signal and ascertaining a compare function, which represents a deviation between the external microphone signal and the internal microphone signal; and
(d) ascertaining a damage classification for classifying damage to the motor vehicle based on the compare function;
wherein the comparing includes ascertaining a transmission function and/or a damping function for a propagation of sound from an external space of the vehicle to an internal space of the vehicle.

14. A device for detecting damage to a motor vehicle, comprising:
at least one external space microphone to acquire an external microphone signal;
at least one internal space microphone to acquire an internal microphone signal; and
a control unit configured to perform the following:
compare the external microphone signal and the internal microphone signal,
ascertain a compare function, which represents a deviation between the external microphone signal and the internal microphone signal, and
ascertain a damage classification for classifying damage to the motor vehicle based on the compare function;
wherein the comparing includes ascertaining a transmission function and/or a damping function for a propagation of sound from an external space of the vehicle to an internal space of the vehicle.

* * * * *